United States Patent
McKay

(10) Patent No.: US 7,029,216 B2
(45) Date of Patent: Apr. 18, 2006

(54) TORQUE-LIMITING LOCKNUT

(75) Inventor: John McKay, Placentia, CA (US)

(73) Assignee: Fluidmaster, Inc., San Juan Capistrano, CA (US)

( * ) Notice: Subject to any disclaimer, the term of this patent is extended or adjusted under 35 U.S.C. 154(b) by 0 days.

(21) Appl. No.: 10/658,965

(22) Filed: Sep. 8, 2003

(65) Prior Publication Data

US 2005/0053443 A1 Mar. 10, 2005

(51) Int. Cl.
*F16B 31/00* (2006.01)

(52) U.S. Cl. .......................................... 411/6; 411/432

(58) Field of Classification Search .................... 411/1, 411/6–8, 432
See application file for complete search history.

(56) References Cited

U.S. PATENT DOCUMENTS

| | | | | |
|---|---|---|---|---|
| 2,685,812 | A | * 8/1954 | Dmitroff | 411/7 |
| 3,280,689 | A | 10/1966 | Rubin | |
| 3,289,524 | A | * 12/1966 | Rubin | 411/7 |
| 3,352,194 | A | * 11/1967 | Kausen | 411/8 |
| 3,352,341 | A | 11/1967 | Schertz | |
| 3,425,314 | A | * 2/1969 | Ohlson | 411/7 |
| 3,504,591 | A | 4/1970 | Christophersen | |
| 3,531,142 | A | 9/1970 | Peasley | |
| 3,709,087 | A | * 1/1973 | Stone, Jr. | 411/6 |
| 4,176,582 | A | * 12/1979 | Witte | 411/7 |
| 4,687,392 | A | 8/1987 | Bidwell | |
| 4,836,727 | A | 6/1989 | Volkmann | |
| 4,930,961 | A | 6/1990 | Weis | |
| 4,934,889 | A | 6/1990 | Kurosaki | |
| 4,990,044 | A | 2/1991 | Kimak | |
| 5,020,949 | A | * 6/1991 | Davidson et al. | 411/7 |
| 5,100,275 | A | 3/1992 | Schirrmacher | |
| 5,118,237 | A | 6/1992 | Wright | |

(Continued)

*Primary Examiner*—Flemming Saether
(74) *Attorney, Agent, or Firm*—Myers Dawes Andras & Sherman LLP; Vic Y. Lin

(57) ABSTRACT

The locknut is adapted for axial engagement of a threaded shaft having an axis and an outer thread. The locknut has properties for limiting a tightening torque on the shaft to a predetermined torque value. In one aspect, a first member is adapted for engagement by a user and rotation about the shaft. A second member having inner threads is disposed in a rotatable, coaxial relationship with the first member. At least one deflection wall is included in the first member and is provided with properties for deflecting outwardly in response to a radial force. At least one deflecting element is included in the second member and is disposed to exert a radial force against the deflection wall. The deflecting element has a generally engaged relationship with the deflection wall at a torque level not greater than the predetermined torque to maintain the inner threads of the second member in an engaged relationship with the first member. The deflecting element has a generally disengaged relationship with the deflection wall at a torque level greater than the predetermined torque to maintain the inner threads of the second member in a generally disengaged relationship with the first member. In another aspect, the locknut has an outer wall configured for engagement by the user and an inner wall. Portions of the inner wall define an inner screw thread configured to engage the outer screw thread of the shaft. In a first position, the portions of the inner wall have a first position wherein the inner threads engage the outer threads to facilitate tightening the locknut on the shaft, and a second position wherein the inner threads disengage the outer threads at a predetermined torque to inhibit any further tightening of the locknut on the shaft.

16 Claims, 4 Drawing Sheets

U.S. PATENT DOCUMENTS

| | | |
|---|---|---|
| 5,324,150 A | 6/1994 | Fullerton |
| 5,795,116 A * | 8/1998 | Frank et al. .................. 411/6 |
| 5,902,085 A | 5/1999 | Yuta |
| 5,906,464 A | 5/1999 | Wedenig |
| 6,070,774 A * | 6/2000 | Rak et al. .................. 224/321 |
| 6,086,282 A | 7/2000 | Dutt et al. |
| 6,361,260 B1 | 3/2002 | Schirrmacher |
| 6,364,585 B1 * | 4/2002 | Sakamoto .................. 411/7 |
| 6,802,680 B1 * | 10/2004 | Rubenstein .................. 411/7 |
| 2003/0068213 A1 | 4/2003 | Janish, Jr. et al. |

* cited by examiner

TORQUE-LIMITING LOCKNUT

BACKGROUND OF THE INVENTION

1. Field of the Invention

This invention relates generally to fasteners and, more specifically to locknuts adapted for use with threaded shafts, such as bolts.

2. Discussion of the Related Art

Nuts are commonly provided with an inner thread that is adapted to engage an outer thread on a shaft. Rotation of the nut relative to the shaft moves the nut axially along the shaft. The threads of the nut can be tightened on the threads of the shaft by applying a torque, the magnitude of which depends on the resistance to rotational and axial movement. This torque places stress on the inner threads of the nut, the outer threads of the shaft, the shaft itself, and any object resisting axial movement of the nut relative to the shaft. Any one of these elements of structure can fail when the torque exceeds a particular value. Accordingly, it is often desirable to limit the torque that can be applied to the nut in order to inhibit failure of these various structural elements. One element that is commonly overstressed is the shaft, particularly when it is provided with a tubular configuration. Under these circumstances, the walls of the shaft are particularly susceptible to breaking under high torque conditions. The structure of the shaft is even further susceptible to breakage when the shaft is made of a non-metal material such as plastic.

In the past, torque-limiting nuts have been provided but typically with very complex structures involving many parts, and a tedious manufacturing process. These nuts have also commonly been made of metal, which does not benefit from the injection molding techniques available to plastic materials. The nuts have also been provided with designs that tend to fail at the torque limit rendering them subsequently useless. In some cases, the nuts have desirably provided a limiting torque in the forward direction, but have undesirably also provided that limiting torque in a reverse direction. Often this has made it impossible to remove the nut.

SUMMARY OF THE INVENTION

In accordance with the present invention, a locknut is provided with characteristics that make it impossible to tighten the nut beyond a predetermined torque. As a result, fragile objects such as a thin or plastic shaft, outer threads of the shaft, inner threads of the nut, and objects limiting axial travel of the nut, can be protected from damage due to over-torquing of the nut. In various embodiments of the torque limiting nut, a wall is provided that is radially deflectable in response to a torque greater than a predetermined torque, to disengage the outer threads of the nut in response to an elevated torque.

In one aspect, the nut is adapted for axial engagement of a threaded shaft having an axis and an outer thread, the nut having properties for limiting a tightening torque on the shaft to a predetermined value. A first member is adapted for rotation about the threaded shaft to facilitate engagement and advancement of the nut along the outer threads. At least one deflection wall is provided in the first member with a generally cylindrical configuration. A second member engages the first member in a coaxial relationship and has an inner thread that is adapted to engage the outer thread of the shaft. At least one deflecting element is included in the second member and disposed in an engaging relationship with the deflection wall. This deflecting element has a generally fixed relationship with the deflection wall at a torque level less than the predetermined torque, to maintain the inner threads of the second member in an engaged relationship with the first member. The deflecting element has a generally free-moving relationship with the deflection wall at a torque level greater than the predetermined torque to maintain the inner threads of the second member in a generally disengaged relationship with the first member.

In another aspect of the invention, the second member has a coaxial relationship with the first member. In this case, the second member and the first member have a rotatable relationship with respect to each other, which is dependent upon an applied torque force. This torque force is in turn dependent on an interference fit between the first member and the second member. This interference fit increases as the torque force approaches a predetermined torque level and decreases beyond the predetermined torque level.

In a further aspect of the invention, the torque-limiting nut has an outer wall that is sized and configured for engagement by the user and adapted for application of the tightening torque to advance the nut on the threaded shaft. An inner wall can be made integral with the outer wall and disposed radially inwardly of the outer wall. Portions of the inner wall define an inner screw thread sized and configured to engage the outer screw thread of the shaft. These portions of the inner wall have a first position wherein the inner threads engage the outer threads to facilitate tightening the nut on the shaft and a second position wherein the inner thread disengages the outer thread at the predetermined torque to inhibit any further tightening of the nut on the shaft.

These and other features and advantages of the invention will become more apparent with a description of preferred embodiments and reference to the associated drawings.

DESCRIPTION OF THE PREFERRED EMBODIMENTS AND BEST MODE OF THE INVENTION

Figure 1:
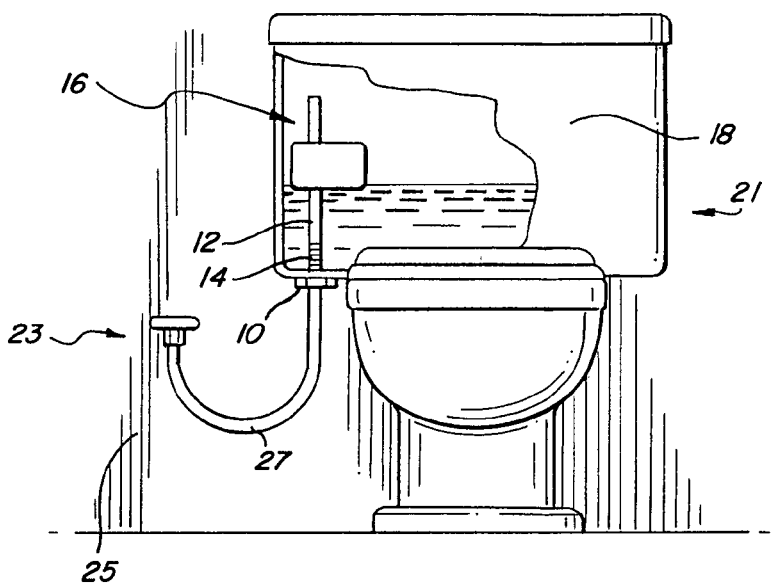
FIG. 1 is a front elevation view of a toilet, partially in phantom and illustrating a fill valve having a threaded shaft and the torque limiting nut of the present invention.

A torque-limiting nut of the present invention is illustrated in FIG. 1 and designated with the reference numeral 10. The nut 10 is operatively disposed on a shaft 12 having outer threads 14. The shaft 12 in this case forms the input tube of a fill valve 16 associated with a tank 18 of a toilet 21. Water, available through a valve 23 at a wall 25, is conducted through a flexible pipe 27, which in turn is coupled to the shaft 12 and metered by the valve 16 into the tank 18.

In this case, the amount of torque applied to the nut 10 produces an increasing force on the shaft 12, threads 14, as well as the nut 10. Since the shaft 12 is typically made of plastic, and since it has a tubular configuration, the thin walls associated with the tube 12 are particularly susceptible to damage due to over-tightening of the nut 10. In order to limit the risks of breaking the shaft 12 or deforming the threads 14, the nut 10 in this case is provided with characteristics that limit the tightening torque, and consequently the force is applied to the shaft 12 and threads 14.

In a preferred embodiment, the nut 10 can be formed as a combination of two members 27 and 30. The first member 27 is illustrated in the top plan view of FIG. 2 and the bottom plan view of FIG. 3. The second member 30 is illustrated in the top plan view of FIG. 4 and the bottom plan view of FIG. 5.

Figure 2:
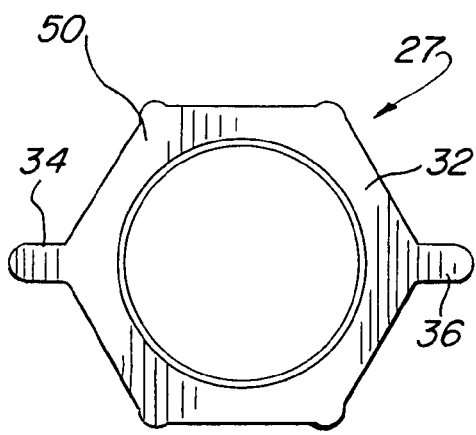
FIG. 2 is a top plan view of a first member of the torque-limiting nut having an outer wall for the application of torque and an inner deflection wall.

In FIG. 2, the first member 27 is shown with an outer wall 32, which can be configured for the application of torque, using a wrench (not shown), or fingers engaging a pair of opposing ears 34 and 36. An inner wall 38, best illustrated in FIG. 3, can be formed with a cylindrical configuration and can be divided into any number of deflection walls 38, 41, 43, and 45, four being shown in the embodiment of FIG. 3. The deflection walls 38–45 in the illustrated embodiment are formed of a material common to that of the outer wall 32 and joined to the outer wall 32 by a base 47 having a top surface 50 (FIG. 2). Each of the deflection walls 38–45 has a leading edge (in the direction of the tightening torque) and a trailing edge. For example, the deflection wall 45 has a leading edge 52 and a trailing edge 54, and the deflection 43 has a leading edge 56 and a trailing edge 58.

Between adjacent deflection walls 38–45, an opening can be formed. For example, between the deflection walls 43 and 45, an opening 61 can be defined by the leading edge 52 of the deflection wall 45 and the trailing edge 58 of the deflection wall 43. This opening 61 is perhaps best illustrated in the cross section view of FIG. 6.

Figure 4:
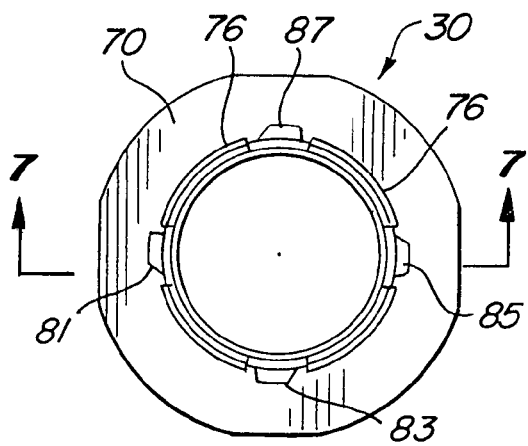
FIG. 4 is a top plan view of a second member of the torque-limiting nut showing a plurality of deflecting elements.
Figure 5:
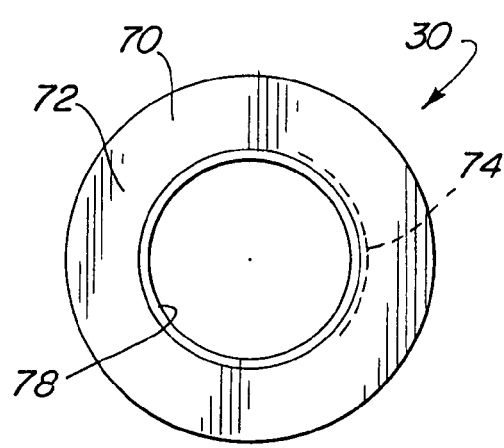
FIG. 5 is a bottom plan view of the second member illustrated in FIG. 4.

The second member 30 of this embodiment of the torque-limiting nut 10 is illustrated in the top plan view of FIG. 4 and the bottom plan view of FIG. 5. This second member 30 includes a base 70 having a bottom surface 72 best shown in FIG. 7. The second member 30 also has an upstanding cylindrical wall 74 that extends upwardly from the base 70 and terminates in a plurality of snap hooks 76, four of which are illustrated in FIG. 4. Interiorly of the cylindrical wall 74, an inner thread 78 is sized and configured to receive the outer thread 14 on the shaft 12 (FIG. 1). Of particular interest to this embodiment is a plurality of deflecting elements 81, 83, 85 and 87, which are preferably equal in number to the number of deflection walls 38–45.

Figure 6:
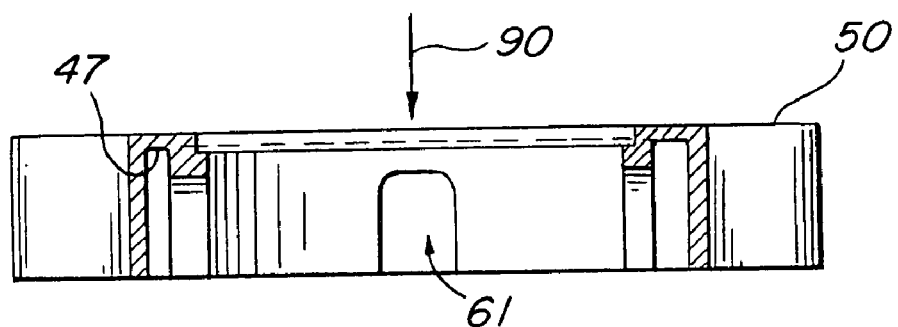
FIG. 6 is a cross section view taken along lines 6—6 of FIG. 3.
Figure 7:
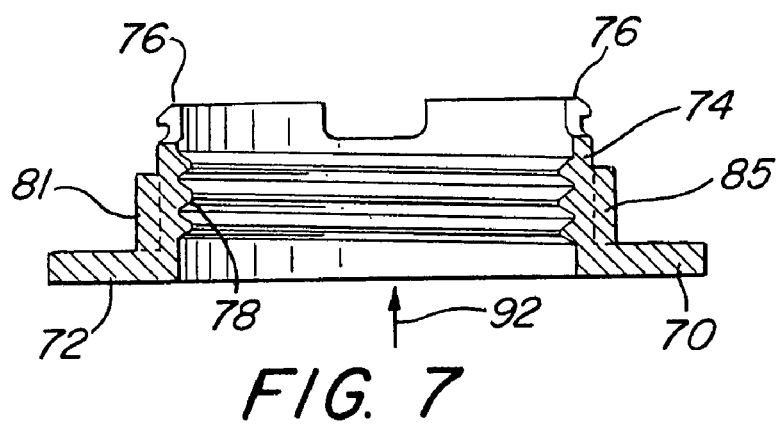
FIG. 7 is a cross section view taken along lines 7—7 of FIG. 4.
Figure 8:
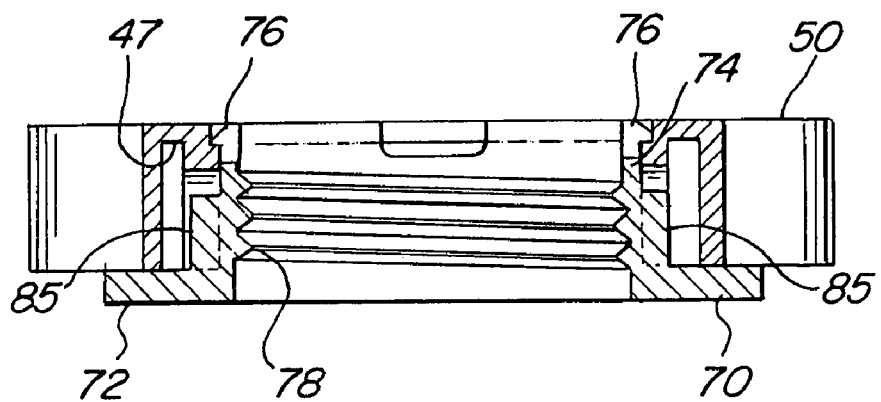
FIG. 8 is a cross section view illustrating the first member of FIG. 6 in a rotational, snap-fit relationship with the second element of FIG. 7.

With the first member 27 and second member 30 thus configured, they are specifically adapted to be aligned and coupled in a snap-fit relationship. As illustrated in FIGS. 6 and 7, these two members 27 and 30 can be axially moved together as illustrated by arrows 90 and 92 in FIGS. 6 and 7. During this assembly, the snap hooks 76 deflect slightly radially inwardly along the deflection walls 38–45 until the hooks 76 clear the top surface 50 of the base 47. At this point, the hooks 76 snap over the top surface 50 thereby maintaining the first member 27 and the second member 30 in a rotatable but axially engaged relationship. It is intended that these two members 27 and 30 not be separated from their snap-fit relationship, as illustrated in FIG. 7, but remain joined throughout the use of the nut 10.

The torque-limiting characteristics associated with the nut 10 are derived in this embodiment from the interaction of the deflection walls 38–45 and the associated deflecting elements 81–85. By way of illustration, the deflection wall 45 is illustrated with the deflecting element 83 in the radial cross section view of FIG. 9. In this figure, the deflection wall 45 is shown with its leading edge 52 and its trailing edge 54 defined with respect to a tightening torque directed along an arrow 94. This deflection wall 45 is further defined by four quadrants 94, 96, 98, and 101, each of which functions in a different manner with respect to the deflecting element 83.

The first quadrant 94 is characterized primarily by the width of the opening 61 (FIG. 3) between the deflection wall 45 and the deflection wall 43.

The second quadrant 96 is disposed at the leading edge 52 of the deflection wall 45, which has a length of reduced thickness, shown by the dimension 105, which is reduced compared to an enlarged thickness shown by the dimension 107.

The second quadrant 96 is defined by a radius 114 that leads to the length of reduced thickness 105 and an incline 110 that ramps outwardly to the greater thickness 107.

Figure 3:
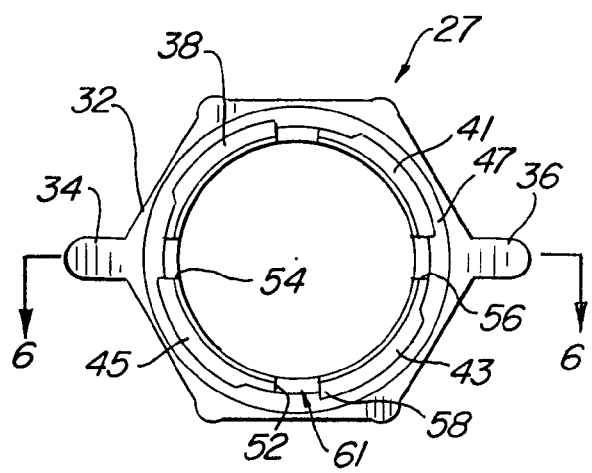
FIG. 3 is a bottom plan view of the first member showing in greater detail the outer wall and the deflection wall.

The third quadrant 98 is defined primarily by the greater thickness 107. It begins with the incline 110, which ramps outwardly from the lesser thickness 105 to the greater thickness 107. The third quadrant 98 ends at an abrupt shoulder 112, which partially defines the opening between the deflection wall 45 and the deflection wall 38 (FIG. 3). This opening is characterized as the fourth quadrant 101.

Figure 9:
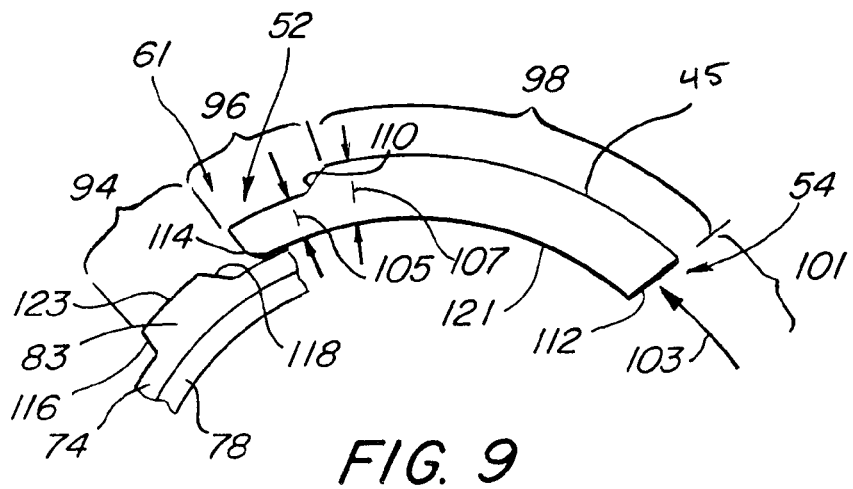
FIG. 9 is a top plan view of the deflection wall relative to the deflecting element in a first quadrant of operation.

In FIG. 9, it can also be seen that the deflecting element 83 in this embodiment is characterized by an abrupt shoulder 116 at the trailing end of the element 83, and an incline 118 facing the leading end 52 of the deflection wall 45.

As the deflecting element 83 moves relative to the deflection wall 45 through the quadrants 94–101, an interference fit is exhibited between an inner surface 121 on the deflection wall 45 and an outer surface 123 on the deflecting element 83. In a preferred embodiment, the surfaces 121 and 123 are roughened in order to increase the coefficient of friction between these two surfaces.

Torque is initially applied by the user to the outer wall 32 of the first member 27 (FIG. 2). In response to that torque, the deflection wall 45 moves in the direction of the arrow 103 in FIG. 9. At low magnitudes of torque, the leading edge 52 of the deflection wall 45 merely pushes the deflecting element 83 ahead of it to rotate the cylindrical wall 74 and associated threads 78 of the second member 30.

As the threads 78 of the second member 30 tighten on the outer threads 14 of the shaft 12 (FIG. 1), the resistance to turning increases and eventually the radius 114 of the deflection wall 45 rides up on the incline 118 of the deflecting element 83. This causes the length of lesser thickness 105 to deflect radially outwardly in the second quadrant 96.

Figure 10:
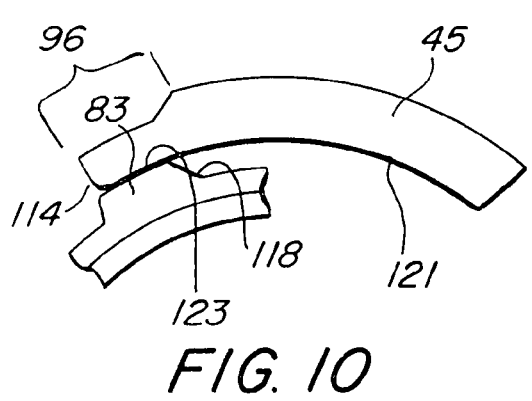
FIG. 10 is a top plan view showing the deflection wall and the deflecting element in a second quadrant of operation.
Figure 11:
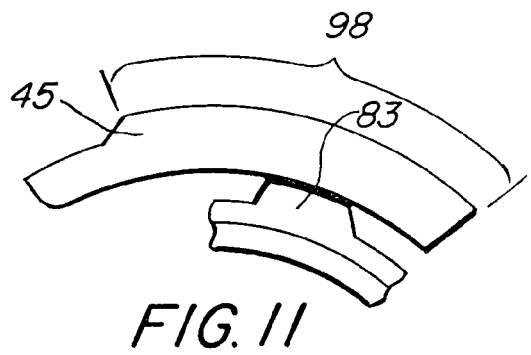
FIG. 11 is a top plan view showing the deflection wall and the deflecting element in a third quadrant of operation.
Figure 13:
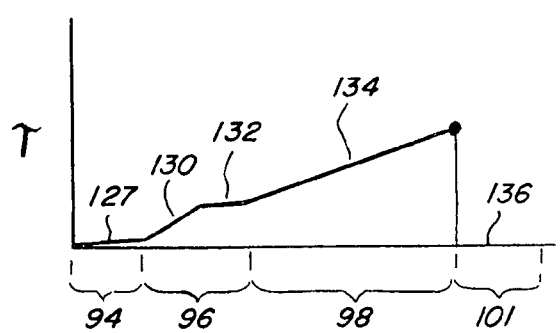
FIG. 13 is a graph showing applied torque plotted against the four quadrants illustrated in FIG. 9 through FIG. 12.

As illustrated in the graph of FIG. 13, the torque rises only slightly in the quadrant 94 and then ramps up rapidly as the area of lesser thickness 105 is deflected. Once the inner surface 121 and outer surface 123 are fully engaged as illustrated in FIG. 10, the torque ramps at a lesser degree but continues to build as illustrated by the line 132 in FIG. 13.

As the deflecting element 83 moves into the third quadrant 98, the greater thickness 107 provides an increased resistance to deflection and the torque further builds along a line 134 in FIG. 13. This resistance to deflection and the corresponding tightening torque builds as the deflecting element 83 approaches the shoulder 112 at the trailing end 54 of the deflection wall 45. At this point, illustrated in FIG. 12, the shoulder 116 of the deflecting element 83 clears the shoulder 112 of the deflection wall 45 and the corresponding torque snaps to zero as illustrated by a line 136 in FIG. 13.

It can be appreciated that this movement of the deflecting element 83 through the quadrants 94–101 is repeated as the deflecting element 83 moves on to contact the leading edge of the next deflection element 38 (FIG. 4). Further movement of the first member 27 relative to the second member 30 will merely reproduce the torque curve of FIG. 13. Note that at no time will the torque applied by the nut 10 to the shaft 12 (FIG. 1) be greater than at a point 136 illustrated at the end of the third quadrant 98 in FIG. 13. The magnitude of the tightening torque at this point 136 can be adjusted during the manufacturing process by controlling the greater thickness 107 of the deflection wall 45, and the roughness of the surfaces 121 and 123, for example.

Figure 12:
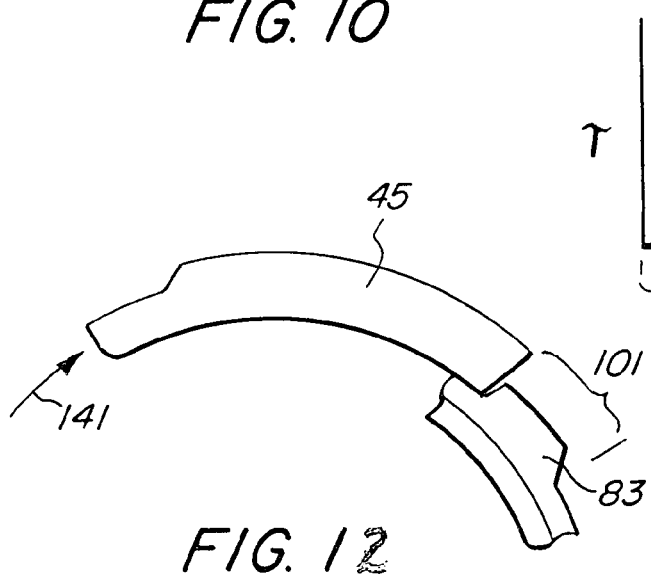
FIG. 12 is a top plan view showing the deflection wall and the deflecting element in a fourth quadrant of operation.

With further reference to FIG. 12, it can be seen that the nut 110 can be easily unscrewed by applying a reverse torque, for example in the direction of an arrow 141. This movement will bring the abrupt shoulder 112 of the deflection wall 45 into engagement with the abrupt shoulder 116 of the deflecting element 83. With this configuration, the wall 45 will not deflect but will maintain full engagement between the first member 27 and second member 30. It is of particular advantage to this construction that torques greater than the predetermined torque can be applied if necessary to remove the nut 10 from the shaft 12.

Figure 14:
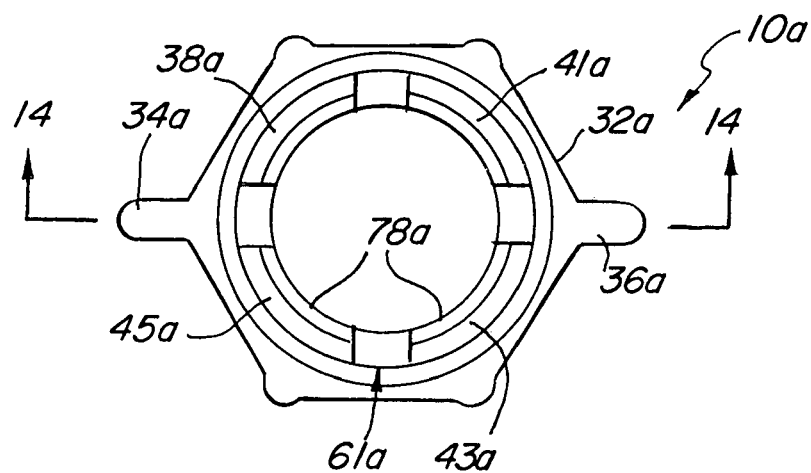
FIG. 14 is bottom plan view of a further embodiment of the invention including deflecting walls that are threaded.
Figure 15:
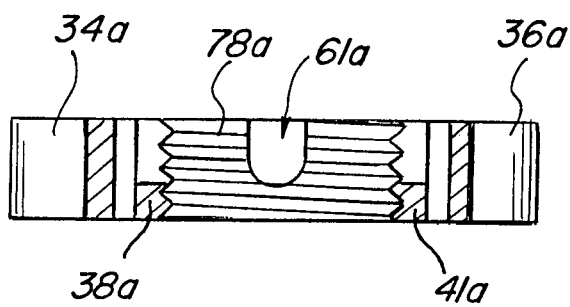
FIG. 15 is a cross section view taken along lines 14—14 of FIG. 13.
Figure 16:
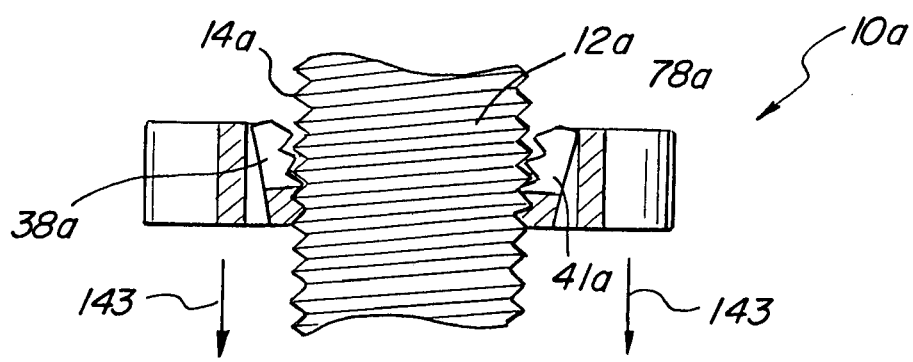
FIG. 16 is a cross section view similar to FIG. 14 and illustrating deflection of the deflection walls in response to a torque greater than the predetermined torque.

A further embodiment of the nut 10 is illustrated in FIGS. 14–16 wherein elements of structure similar to those previously discussed are illustrated with the same reference numeral followed by the lower case letter "a." Thus, in FIG. 14, the nut 10a is illustrated with an outer wall 32a that can be turned or torqued, for example, by engaging the ears 34a and 36a.

In this single piece construction, the deflection walls 38a–45a are threaded along their inner surfaces to form the inner thread 78a. This thread 78a is discontinuous where the adjacent deflection walls 38a–45a define openings, such as the opening 61a.

Operation of this single piece nut 10a, is illustrated in FIG. 16, which also shows the tubular shaft 12a and associated outer threads 14a. In this view, the nut 10a has been tightened to the predetermined torque level, causing the inner threads 78a to move axially along the outer threads 14a. This movement causes the deflection walls 38a–45a to bend outwardly until the inner threads 78a clear the outer threads 14a. At this point, the nut 10a moves axially one thread width thereby reducing the tightening torque of the nut. It can be seen that continued attempts to tighten the nut 10a will each terminate at the predetermined torque where the nut 10a jumps axially backwardly relative to the shaft 12a as illustrated by arrows 143.

Notwithstanding the forgoing detailed description of preferred embodiments, it will be apparent that many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different elements.

Also, the words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

The invention claimed is:

1. A locknut adapted for axial engagement of a threaded shaft having an axis and an outer thread, the nut having properties for limiting a tightening torque on the shaft to a predetermined torque, comprising:
   a first member adapted for rotation about the threaded shaft to facilitate engagement of the outer threads of the shaft;
   at least one deflection wall included in the first member and having properties for deflecting outwardly in response to a radial force;
   at least one second member having inner threads and being disposed in a rotatable, coaxial relationship with the first member;
   at least one deflecting element included in the second member and disposed in an engaging relationship with the deflection wall of the first member, the deflecting element comprising circumferental incline at a leading end and an abrupt shoulder at a trailing end having a greater circumferential incline than said leading end, the leading end incline having a first circumferential distance and being spaced a second circumferential distance from the abrupt shoulder that is greater than the first circumferential distance, the deflecting element having a portion with uniform thickness extending the second circumferential distance between the incline and the trailing end;

the deflecting element having a generally engaged relationship with the deflection wall at a torque level not greater than the predetermined torque to maintain the inner threads of the second member in an engaged relationship with the first member; and the deflecting element having a generally disengaged relationship with the deflection wall at a torque level greater than the predetermined torque to maintain the inner threads of the second member in a generally disengaged relationship with the first member.

2. The locknut recited in claim 1 wherein the generally engaged relationship of the deflecting element with a deflection wall is characterized by a friction force between the deflecting element and the deflection wall that increases as the torque level approaches the predetermined torque.

3. The locknut recited in claim 2 wherein the friction force is dependent on the resistance to deflection of the deflection wall by the deflecting element.

4. The locknut recited in claim 3 wherein the deflection wall has a thickness, and the resistance to deflection of the deflection wall is dependent on the thickness of the deflection wall.

5. The locknut recited in claim 1 wherein the deflecting element contacts the deflection wall in an interference fit that increases as the torque level approaches the predetermined torque.

6. The locknut recited in claim 5 wherein the deflecting element consecutively engages the deflection wall, slides along the deflection wall up to the predetermined torque, and disengages the deflection wall at the predetermined torque.

7. The locknut recited in claim 1 wherein the deflection wall is non-continuous.

8. The locknut recited in claim 1 wherein the second member has a snap-fit rotational relationship with the first member.

9. The locknut recited in claim 1 wherein the portion with the uniform thickness comprises a first portion with a first uniform thickness, and the deflection wall further comprises a second portion with a second uniform thickness that is less than the first uniform thickness.

10. The locknut recited claim 11 wherein the deflection wall comprises a ramp disposed between the first portion and the second portion.

11. A locknut adapted for axial engagement of a threaded shaft having an axis and an outer thread, the locknut having properties for limiting a tightening torque on the shaft to a predetermined torque level, comprising:

a first member adapted for rotation about the threaded shaft to facilitate axial advancement of the locknut along the shaft, the first member including a deflection wall having properties for deflecting outwardly in response to a radial force;

at least one second member disposed in a coaxial relationship with the first member, the second member having inner threads and a deflecting element, the deflecting element comprising circumferential incline at a leading end and an abrupt shoulder at a trailing end having a greater circumferential incline than said leading end, the leading end incline having a first circumferential distance and being spaced a second circumferential distance from the abrupt shoulder that is greater than the first circumferential distance, the deflecting element having a portion with uniform thickness extending the second circumferential distance between the incline and the trailing end;

the second member and the first member being rotatable relative to each other with a torque force dependent on an interference fit between the first member and the second member; and the interference fit increasing as the torque force approaches the predetermined torque level and decreases at the predetermined torque level.

12. The locknut recited in claim 11 wherein the deflection wall has an increasing thickness in a first circumferential direction.

13. The locknut recited in claim 12 wherein the deflection wall is included in the first member and the first circumferential direction is a direction of increasing torque force.

14. The locknut recited in claim 12 wherein the deflecting element has an increasing thickness in a second circumferential direction opposite to the first circumferential direction.

15. The locknut recited in claim 11 wherein the portion with the uniform thickness comprises a first portion with a first uniform thickness, and the deflection wall further comprises a second portion with a second uniform thickness that is less than the first uniform thickness.

16. The locknut recited claim 15 wherein the deflection wall comprises a ramp disposed between the first portion and the second portion.

* * * * *